US010855041B2

(12) United States Patent
Chou et al.

(10) Patent No.: US 10,855,041 B2
(45) Date of Patent: Dec. 1, 2020

(54) OPTICAL TO ELECTRICAL ADAPTER

(71) Applicant: Optomedia Technology Inc., Hsinchu County (TW)

(72) Inventors: Hui-Tsuo Chou, Hsinchu County (TW); Pei-Hsiang Hsu, Hsinchu County (TW)

(73) Assignee: OPTOMEDIA TECHNOLOGY INC., Hsinchu (TW)

( * ) Notice: Subject to any disclaimer, the term of this patent is extended or adjusted under 35 U.S.C. 154(b) by 0 days.

(21) Appl. No.: 16/401,532

(22) Filed: May 2, 2019

(65) Prior Publication Data

US 2020/0106227 A1 Apr. 2, 2020

Related U.S. Application Data

(60) Provisional application No. 62/738,249, filed on Sep. 28, 2018.

(51) Int. Cl.
*H01R 35/02* (2006.01)
*G02B 6/42* (2006.01)
*H01R 13/66* (2006.01)
*H01R 31/06* (2006.01)

(52) U.S. Cl.
CPC .......... *H01R 35/02* (2013.01); *G02B 6/4292* (2013.01); *H01R 13/6675* (2013.01); *H01R 31/065* (2013.01)

(58) Field of Classification Search
CPC .. H01R 35/02; H01R 31/065; H01R 13/6675; G02B 6/4292
See application file for complete search history.

(56) References Cited

U.S. PATENT DOCUMENTS

| 5,104,243 | A  | * | 4/1992 | Harding   | G02B 6/4292 |
|           |    |   |        |           | 385/84      |
| 6,227,720 | B1 | * | 5/2001 | Isaksson  | G02B 6/4249 |
|           |    |   |        |           | 385/59      |
| 7,090,527 | B2 | * | 8/2006 | Hanley    | G02B 6/4292 |
|           |    |   |        |           | 439/372     |
| 7,326,087 | B2 | * | 2/2008 | Gerlach   | G02B 6/3817 |
|           |    |   |        |           | 385/53      |
| 7,331,819 | B2 | * | 2/2008 | Nelson    | G02B 6/4201 |
|           |    |   |        |           | 385/88      |
| 7,393,147 | B1 | * | 7/2008 | Rollinger | G02B 6/4201 |
|           |    |   |        |           | 385/92      |

(Continued)

*Primary Examiner* — Abdullah A Riyami
*Assistant Examiner* — Nader J Alhawamdeh
(74) *Attorney, Agent, or Firm* — Chun-Ming Shih; HDLS IPR Services

(57) ABSTRACT

The present invention provides an optical to electrical converter, which comprises an optical transmission unit, an electrical transmission unit and a rotating mechanism. The optical transmission unit is connected to the electrical transmission unit via the rotating unit, and the optical transmission unit and the electrical transmission unit can be rotated relative to each other by the rotating mechanism. Further, the electrical transmission unit is able to connect to a system end, such as a computer, and perform electrical signal transmission with the system end (computer), thereby enabling the system end (computer) having an optical transmission function via the optical to electrical converter.

10 Claims, 8 Drawing Sheets

(56) References Cited

U.S. PATENT DOCUMENTS

| | | | | |
|---|---|---|---|---|
| 8,794,850 | B2* | 8/2014 | Su | G02B 6/3817 |
| | | | | 385/75 |
| 9,103,948 | B2* | 8/2015 | Jiang | H04Q 1/00 |
| 9,395,498 | B2* | 7/2016 | Lin | G02B 6/32 |
| 9,935,408 | B1* | 4/2018 | Pathak | H01R 13/6335 |
| 10,063,021 | B1* | 8/2018 | Lipke | H01R 13/719 |
| 10,320,482 | B2* | 6/2019 | Chou | H04B 10/2503 |
| 10,469,175 | B2* | 11/2019 | Jachetta | H04B 10/43 |
| 10,594,093 | B2* | 3/2020 | Lipke | H01R 12/592 |
| 2013/0323940 | A1* | 12/2013 | Coffey | G02B 6/387 |
| | | | | 439/38 |
| 2014/0072264 | A1* | 3/2014 | Schroder | H04J 14/00 |
| | | | | 385/76 |
| 2014/0127937 | A1* | 5/2014 | Huang | H01R 35/04 |
| | | | | 439/534 |
| 2015/0222363 | A1* | 8/2015 | Morgan | G02B 6/4284 |
| | | | | 398/135 |
| 2018/0031775 | A1* | 2/2018 | Gurreri | G02B 6/3893 |
| 2018/0149819 | A1* | 5/2018 | Rivaud | G02B 6/4292 |

* cited by examiner

OPTICAL TO ELECTRICAL ADAPTER

REFERENCE TO RELATED APPLICATIONS

This Application is based on Provisional Patent Application Ser. No. 62/738,249, filed 28 Sep. 2018, currently pending.

FIELD OF THE INVENTION

The invention relates to an optical to electrical adapter, which is able to connect to a computer, so that the computer has the function of transmitting and receiving optical signals.

BACKGROUND

Optical communication is, also known as optical telecommunication, is communication at a distance using light to carry information, wherein fiber-optic communication is currently the most common optical communications technology. Fiber-optic communication is a method of transmitting information from one place to another by sending pulses of light through an optical fiber, and is one of wired communications. Due to much lower attenuation and interference, optical fiber has large advantages over existing copper wire in long-distance, high-demand applications, and thus optical fibers have largely replaced copper wire communications in core networks in the developed world.

In the field of optical communication, an optical transceiver is an important component, such as a high-speed Ethernet interface converter (GBIC). The optical transceiver is mainly disposed on the host device, and mainly includes a light emitter and a photodetector. The light emitter is used to convert the electrical signal into an optical signal, and then transmits the optical signal through the optical fiber. The photodetector is used to convert the received optical signal into the electrical signal, and then transmits the electrical signal to the host device.

However, in order to reduce the size and the cost, most computers do not have an optical transceiver, so that the computer cannot directly connect to the optical fiber communication line.

SUMMARY

An object of the present invention is to provide an optical to electrical adapter including an electrical transmission unit and an optical transmission unit. A rotating mechanism is used to connect the electrical transmission unit and the optical transmission unit, such that the electrical transmission unit and the optical transmission unit are rotatable relative to each other by the rotating mechanism to improve the convenience of using the optical to electrical adapter.

It is another object of the present invention to provide an optical to electrical adapter including an optical transmission unit, an electrical transmission unit and a converter, wherein the converter is electrically connected to the optical transmission unit and the electrical transmission unit for performing conversion between the optical signal and the electrical signal. The electrical transmission unit of the optical to electrical adapter can be inserted into an electrical connection seat of a computer, so that the computer has function of transmitting and receiving optical signals.

An object of the present invention is to provide an optical to electrical adapter, wherein the electrical transmission unit of the optical to electrical adapter may be a USB connector or an RJ-45 connector, and is able to insert into a USB connection seat or an RJ-45 connection seat of the computer. In addition, the optical transmission unit may be an ST, an SC, an FC or an LC connection seat, and a ST, a SC, a FC or a LC connector can be inserted into the optical transmission unit for providing function of transmitting and receiving optical signals to the computer.

The present invention provides an optical to electrical adapter comprising: an electrical transmission unit for transmitting and receiving an electrical signal; a first housing connected to the electrical transmission unit; an optical transmission unit for transmitting and receiving an optical signal, and electrically connecting to the electrical transmission unit; a second housing connected to the optical transmission unit, and partially overlapping the first housing to form an overlap region therebetween; and a rotating mechanism connecting the overlap region between the first housing and the second housing, such that the first housing and the electrical transmission unit are rotatable relatively to the second housing and the optical transmission unit by the rotating mechanism.

The present invention provides another optical to electrical adapter comprising: an electrical transmission unit for transmitting and receiving an electrical signal; an optical transmission unit for transmitting and receiving an optical signal, and electrically connecting the electrical transmission unit; and a housing connected with the electrical transmission unit and the optical transmission unit.

BRIEF DESCRIPTION OF THE DRAWINGS

The structure as well as preferred modes of use, further objects, and advantages of this invention will be best understood by referring to the following detailed description of some illustrative embodiments in conjunction with the accompanying drawings, in which.

DETAILED DESCRIPTION OF THE PREFERRED EMBODIMENTS

Figure 1:
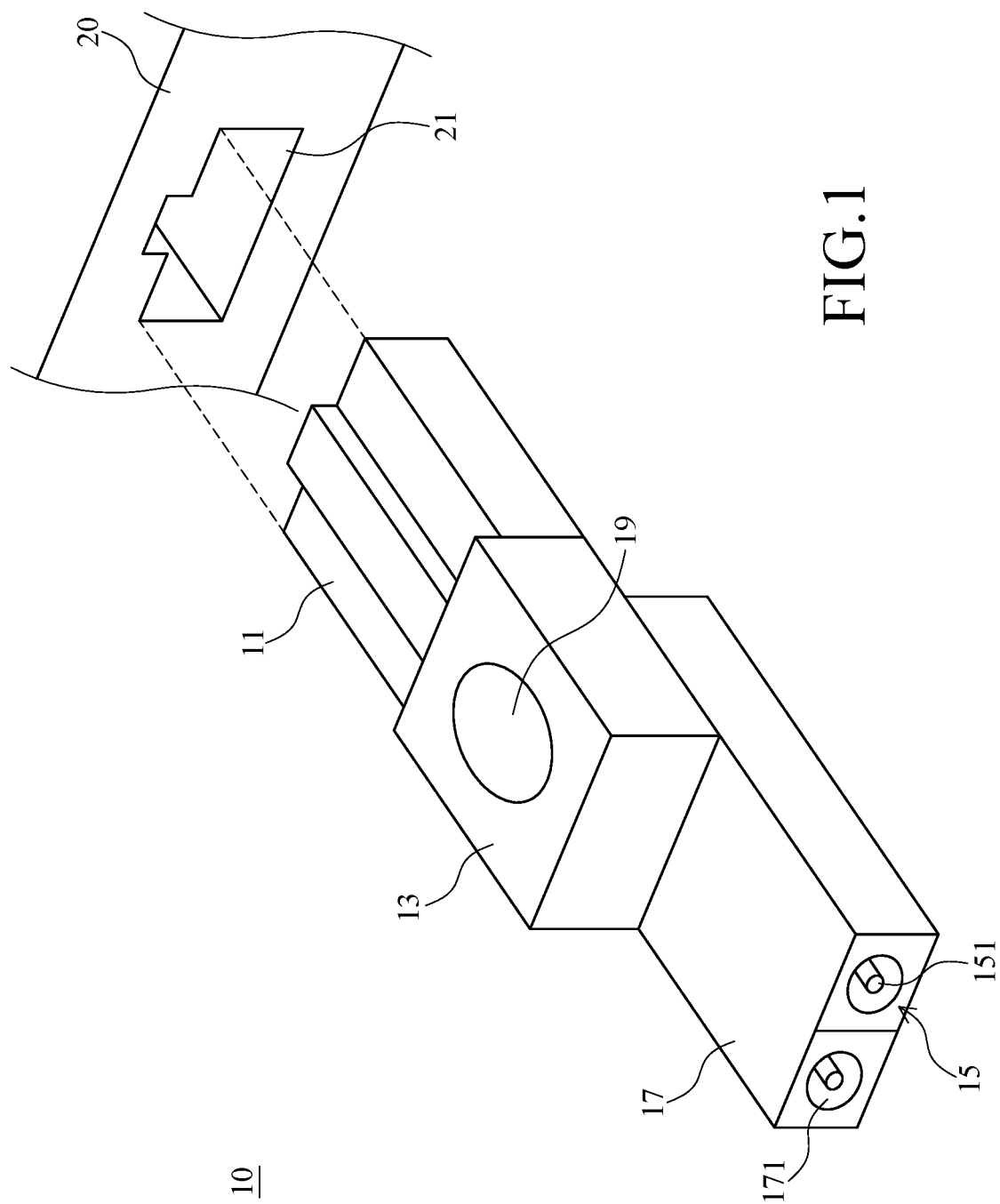
FIG. 1 and FIG. 2 are perspective views of an optical to electrical adapter according to an embodiment of the invention.
Figure 2:
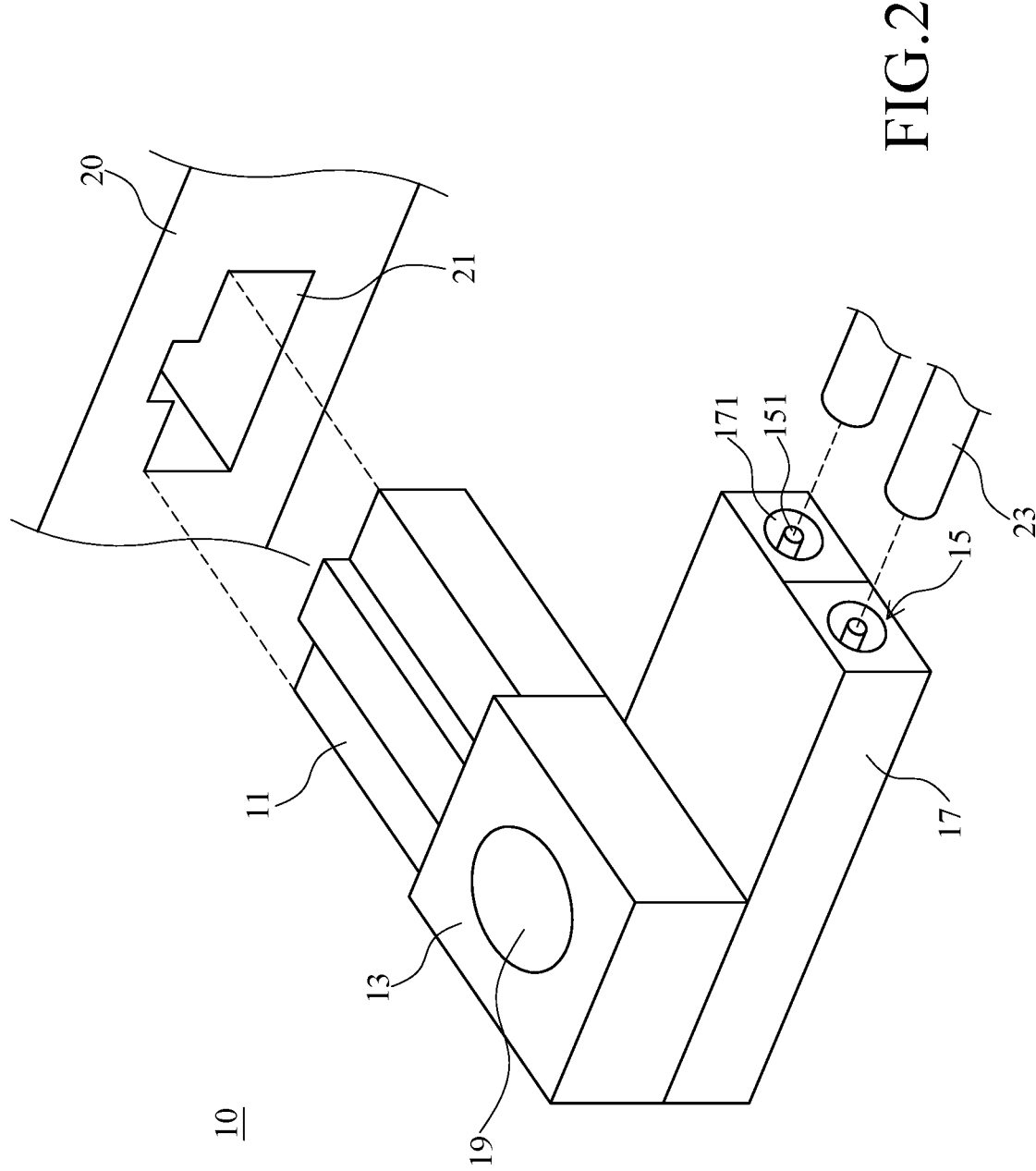

FIG. 1 and FIG. 2 are perspective views of an optical to electrical adapter according to an embodiment of the invention. The optical to electrical adapter 10 includes an electrical transmission unit 11, a first housing 13, an optical transmission unit 15, a second housing 17 and a rotating mechanism 19. The electrical transmission unit 11 is connected to the first housing 13, and the optical transmission unit 15 is connected to the second housing 17. Further, the first housing 13 and the electrical transmission unit 15 are rotatable relatively to the second housing 17 and the optical transmission unit 15 by the rotating mechanism 19, thus to change the angle between the electrical transmission unit 11 and the optical transmission unit 15.

The electrical transmission unit 11 is configured to transmit and receive an electrical signal. The electrical transmission unit 11 may be an electrical connector or a male connection unit, such as a USB male connector or an RJ-45 male connector, and can be used to insert into an electrical connection seat 21 or a female connection unit, such as a USB female connection seat or an RJ-45 female connection seat, on the computer 20. Thus, the electrical transmission unit 11 is able to be communicatively connected to the computer 20, and transmits or receives electrical signals with the computer 20.

Figure 3:
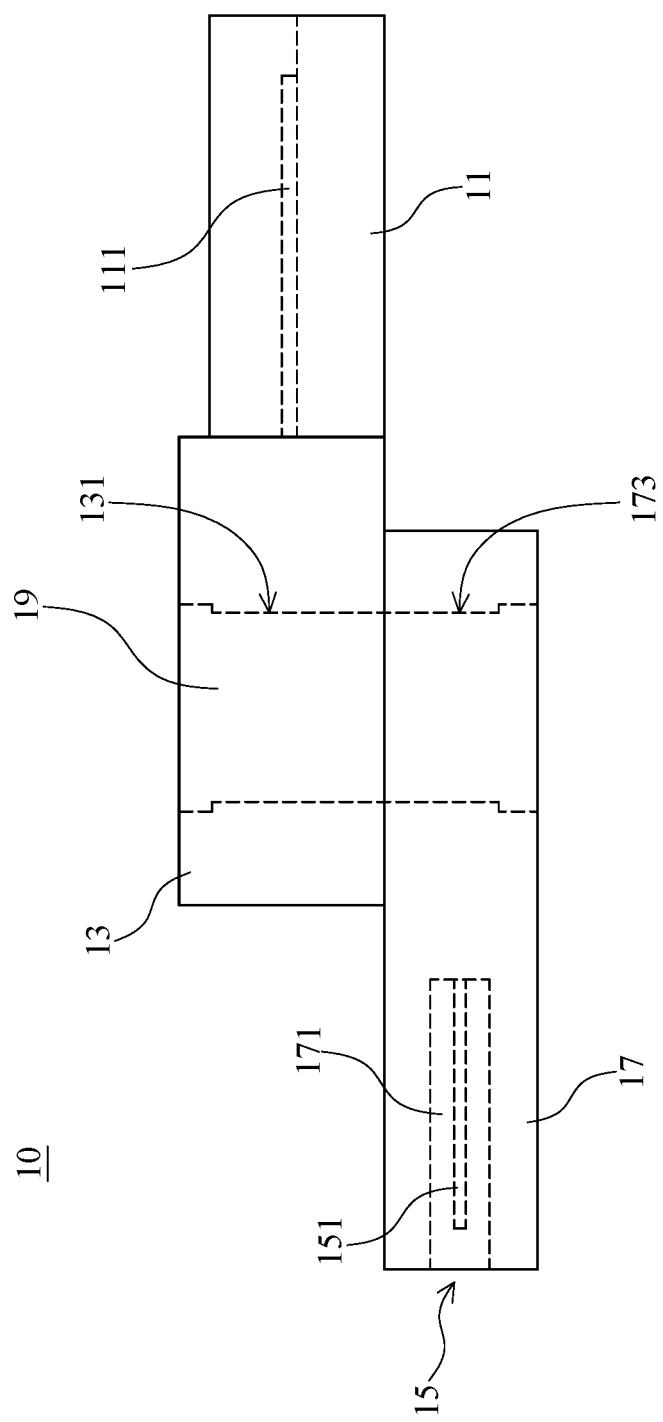
FIG. 3 is a side perspective of an optical to electrical adapter according to an embodiment of the invention.

In one embodiment of the invention, the electrical transmission unit 11 comprises at least one electrical transmission interface 111, as shown in FIG. 3. For example, the electrical transmission interface 111 may comply with the USB or RJ-45 transmission protocol, so that the electrical transmission unit 11 is able to transmit the electrical signal to the computer 20 or receive the electrical signal from the computer 20 via the electrical connection seat 21.

The optical transmission unit 15 is configured to transmit and receive an optical signal, and is electrically connected to the electrical transmission unit 11. The optical transmission unit 15 may be an optical connection seat or a female connection unit, such as ST, SC, FC or LC connection seat, and the corresponding optical connector 23 is able to insert into the optical transmission unit 15. For example, ST, SC, FC or LC male connector is able to respectively insert into the ST, SC, FC or LC connection seat. So that the light transmission unit 15 is communicatively connected to the optical connector 23, and executes transmission or receiving of the optical signals with the optical connector 23. For example, the light transmission unit 15 may transmit the optical signal to the optical connector 23, or receive the optical signal from the optical connector 23, as shown in FIG. 2.

One end of the electrical transmission unit 11 is able to connect to the electrical connection seat 21 of the computer 20, and the other end of the electrical transmission unit 11 is connected to the first housing 13. For example, the first housing 13 covers a portion of the electrical transmission unit 11. In a practical application, the electrical transmission unit 11 and the first housing 13 may be made by the same material, and integrated into a single member. For example, the electrical transmission unit 11 and the first housing 13 have the same thickness, and the first housing 13 covers the electrical transmission interface 111 to form the electrical transmission unit 11.

The second housing 17 connects or covers the optical transmission unit 15 to form the optical connection seat. For example, the second housing 17 includes at least one space 171, and the optical transmission unit 15 includes at least one optical transmission interface 151, wherein the optical transmission interface 151 is located within the space 171 and is covered by the second housing 17. Further, the optical connector 23 can be inserted into the space 171 of the second housing 17, and connected to the optical transmission interface 151 in the space 171.

The first housing 13 partially overlaps the second housing 17 to form an overlap region, and the rotating mechanism 19 is connected to the overlap region between the first housing 13 and the second housing 17, as shown in FIG. 3. For example, the first housing 13 may include a first hole 131, and the second housing 17 may include a second hole 173. The first hole 131 of the first housing 13 is aligned with the second hole 173 of the second housing 17, and the rotating mechanism 19 may comprise a rotating shaft and pass through a first hole 131 and a second hole 173 to connect the first housing 13 and the second housing 17.

The first housing 13 is rotatable relatively to the second housing 17 by the rotating mechanism 19 to improve the convenience of using the optical to electrical adapter 10. Specifically, when the user connects the optical to electrical adapter 10 to the computer 20, the angle between the first housing 13 and the second housing 17 may be adjusted to 180 degrees, as shown in FIG. 1. Thus, the user is able to hold the optical to electrical adapter 10 easily, and then inserts the electrical transmission unit 11 of the optical to electrical adapter 10 into the electrical connection seat 21 of the computer 20 or removes the electrical transmission unit 11 of the optical to electrical adapter 10 from the electrical connection seat 21 of the computer, as shown in FIG. 1.

Furthermore, when the optical to electrical adapter 10 has been inserted into the electrical connection seat 21 of the computer 20, the user can adjust the angle between the first housing 13 and the second housing 17. The angle between the first housing 13 and the second housing 17, for example, may be adjusted to 90 degrees, as shown in FIG. 2.

In one embodiment of the invention, the first housing 13 and the second housing 17 are approximately cuboid in shape, wherein the first housing 13 may be disposed on the second housing 17, as shown in FIG. 1, FIG. 2 and FIG. 3, a portion of the first housing 13 may be stacked on the upper surface of a portion of the second housing 17. In other embodiment of the invention, a portion of the first housing 13 may also be stacked on the lower surface of a portion of the second housing 17.

In the drawing of the invention, the first housing 13 connected with the electrical transmission unit 11 is disposed above the second housing 17 connected with the optical transmission unit 15. In other embodiment of the invention, the first housing 13 connected with the electrical transmission unit 11 is disposed under the second housing 17 connected the optical transmission unit 15.

Figure 4:
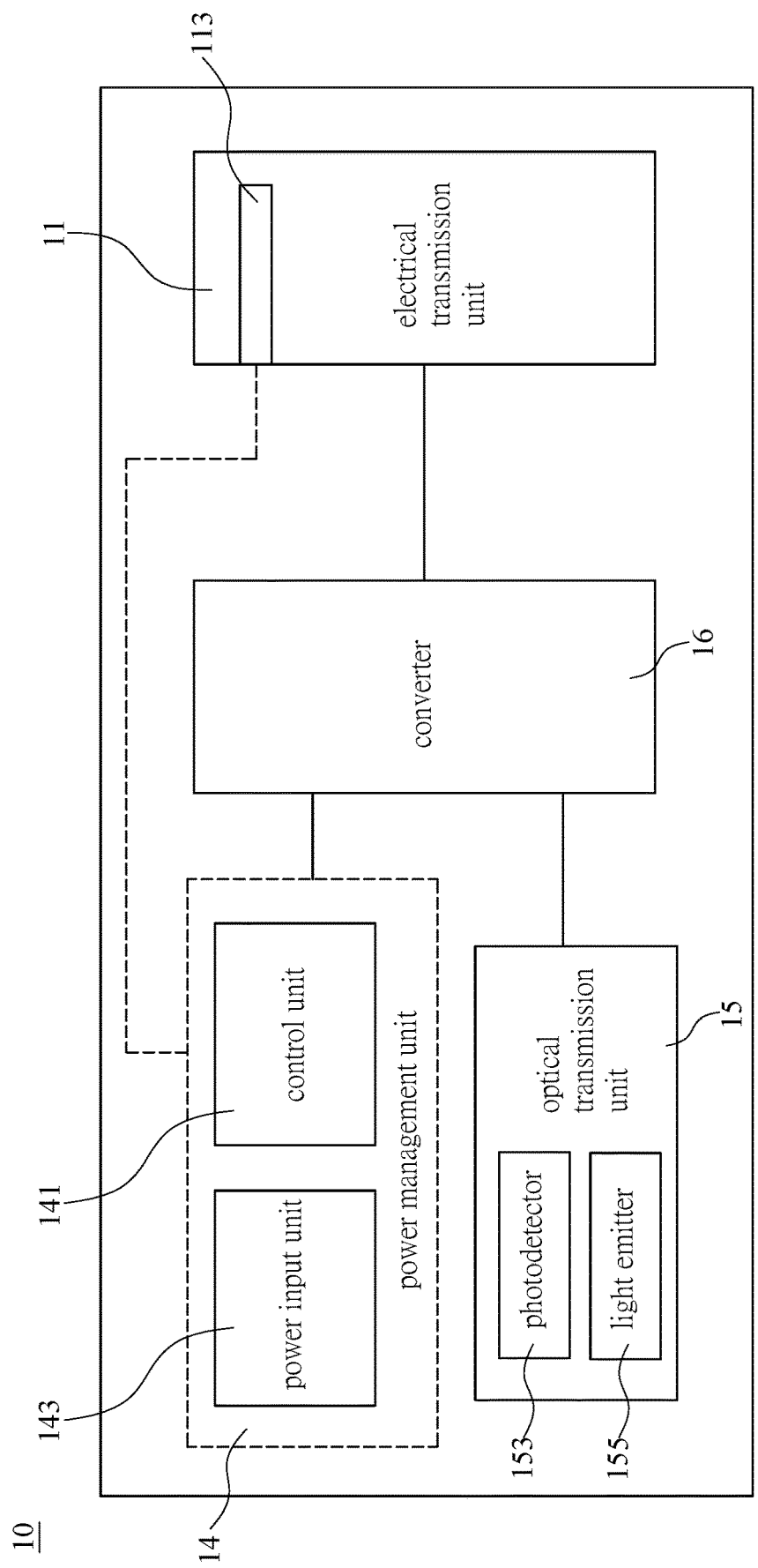
FIG. 4 is a block diagram of an optical to electrical adapter according to an embodiment of the present invention.

Please referring to FIG. 4, is a block diagram of an optical to electrical adapter according to an embodiment of the invention. As shown, the optical to electrical adapter 10 includes an electrical transmission unit 11, an optical transmission unit 15, a converter 16 and a power management unit 14, wherein the converter 16 is an optical-electrical converter and is electrically connected to the electrical transmission unit 11, the optical transmission unit 15 and the power management unit 14.

The electrical transmission unit 11 may be an electrical connector or a male connection unit, such as a USB connector or an RJ-45 connector, for inserting into the electrical connection seat 21 on the computer 20, and transmits or receives the electrical signal according to the USB transmission protocol or the RJ-45 transmission protocol, as shown in FIG. 1 and FIG. 2.

The optical transmission unit 15 may be an optical connection seat or a female connection unit, such as ST, SC, FC or LC connection seat, and the optical connector 23 is able to be inserted into the optical connection seat 15, as shown in FIG. 2.

In one embodiment of the invention, the optical transmission unit 15 includes a photodetector 153 and a light emitter 155. In the process of transmitting the optical signal, the light emitter 155 converts received electrical signal into the optical signal, and then the optical signal is transmitted to the outside, such as an optical fiber, via the optical connector 23 that is connected to the optical transmission unit 15. In particular, the light emitter 155 may comprise a light emitting diode.

In the process of receiving the optical signal, the optical transmission unit 15 receives the optical signal from the connected optical connector 23 and the optical fiber, and converts the optical signal into the electrical signal. Specifically, the photodetector 153 of the optical transmission unit 15 is capable of converting the received optical signal into the electrical signal using the photoelectric effect. The electrical signal is then transmitted to a converter 16, and transmitted to the computer 20 via the converter 16 and the electrical connection seat 21.

The computer 20 has the functions of receiving and transmitting the optical signal, by connecting with the optical to electrical adapter 10. Specifically, the electrical transmission unit 11 of the optical to electrical adapter 10 is inserted into the electrical connection seat 21, such as a USB connection seat or RJ-45 connection seat, of the computer 20, and then the computer 20 is able to transmit and receive optical signals via the optical to electrical adapter 10.

In one embodiment of the invention, it is generally required to provide a driving power to drive the optical to electrical adapter 10 to perform conversion between the optical signal and the electrical signal. More specifically, the computer 20 can provide a supply power to the optical to electrical adapter 10 through the electrical connection seat 21 to drive the optical to electrical adapter 10. For example, the optical to electrical adapter 10 receives the supply power provided by the computer 20 via the power supply pin 113 of the electrical transmission unit 11, and further converts the received supply power into the driving power to drive the photodetector 153 to perform conversion of the optical signal and the electrical signal, or drive the light emitter 155 to emit the optical signal.

However, when the electrical connection seat 21 of the computer 20 does not provide the supply power to the optical to electrical adapter 10, it may cause the optical to electrical adapter 10 unable to operate. In one embodiment of the invention, the optical to electrical adapter 10 may further include a power management unit 14 electrically connected to the converter 16 for providing the driving power to the photodetector 153 and/or the light emitter 155 via the converter 16. Therefore, even if the electrical connection seat 21 of the computer 20 cannot provide the driving power to the optical to electrical adapter 10, the photodetector 153 and/or the light emitter 155 of the optical to electrical adapter 10 can still perform conversion between the optical signal and the electrical signal and the emitting optical signal.

In one embodiment of the invention, the power management unit 14 includes a power input unit 143 and a control unit 141, wherein the control unit 141 is electrically connected to the power input unit 143, the converter 16, the photodetector 153, the light emitter 155 and/or the electrical transmission unit 11. The power input unit 143 can be used to provide the driving power to the converter 16, the photodetector 153, and/or the light emitter 155. For example, the power input unit 143 may include an external power input interface for connecting with a power supply line. In other embodiment of the invention, the power input unit 143 may include a power storage unit for storing power and providing the driving power.

Specifically, the electrical transmission unit 11 may include a power supply pin 113. When the electrical transmission unit 11 is connected to the electrical connection seat 21 of the computer 20, the power pin 113 is able to receive the supply power from a corresponding pin of the electrical connection seat 21.

In one embodiment of the invention, the control unit 141 can be electrically connected to the power supply pin 113 of the electrical transmission unit 11, determine whether there is the supply power on the power supply pin 113, and control the power input unit 143 whether provide the driving power to the converter 16, the photodetector 153, and/or the light emitter 155. When the control unit 141 determines that there is the supply power on the power supply pin 113 of the electrical transmission unit 11, the power input unit 143 controlled by the control unit 141 will not provide the driving power to the converter 16, the photodetector 153 and/or light emitter 155. On the contrary, when the control unit 141 determines that there is no the supply power on the power supply pin 113 of the electrical transmission unit 11, and the photodetector 153 needs to perform photoelectric conversion, or the light emitter needs to be emitted the optical signal, the power input unit 143 will be controlled by the control unit 141 to provide the driving power to the converter 16, the photodetector 153, and/or the light emitter 155.

In one embodiment of the invention, the supply power can be transmitted to the power management unit 14 via the power supply pin 113, and the power management unit 14 is able to convert the supply power to the driving power for driving the converter 16, the photodetector 153 and/or light emitter 155.

In one embodiment of the invention, the power management unit 14 and/or the converter 16 may be disposed within the first housing 13 or the second housing 17. In addition, at least one bendable transmission line or a bendable PCB may be used to be electrically connected to the electrical transmission unit 11, the power management unit 14, the converter 16 and/or the optical transmission unit 15. Thus, the first housing 13 and the second housing 17 are able to be rotated on the rotating mechanism 19 without affecting the electrical connection of each device.

The converter 16 is electrically connected to the electrical transmission unit 11 and the optical transmission unit 15, and can be used for amplifying and converting signals. Specifically, a photodetector 153 is used to convert the optical signal into a photocurrent, and converter 16 convers the photocurrent into a voltage signal and then amplifies the voltage signal. For example, the converter is typically coupled with a transimpedance amplifier (TIA) and a limiting amplifier (LA) to produce a digital signal in the electrical domain from the incoming optical signal, which may be attenuated and distorted while passing through the channel. Further signal processing such as clock recovery from data (CDR) performed by a phase-locked loop may also be applied before the data is passed on.

Figure 5:
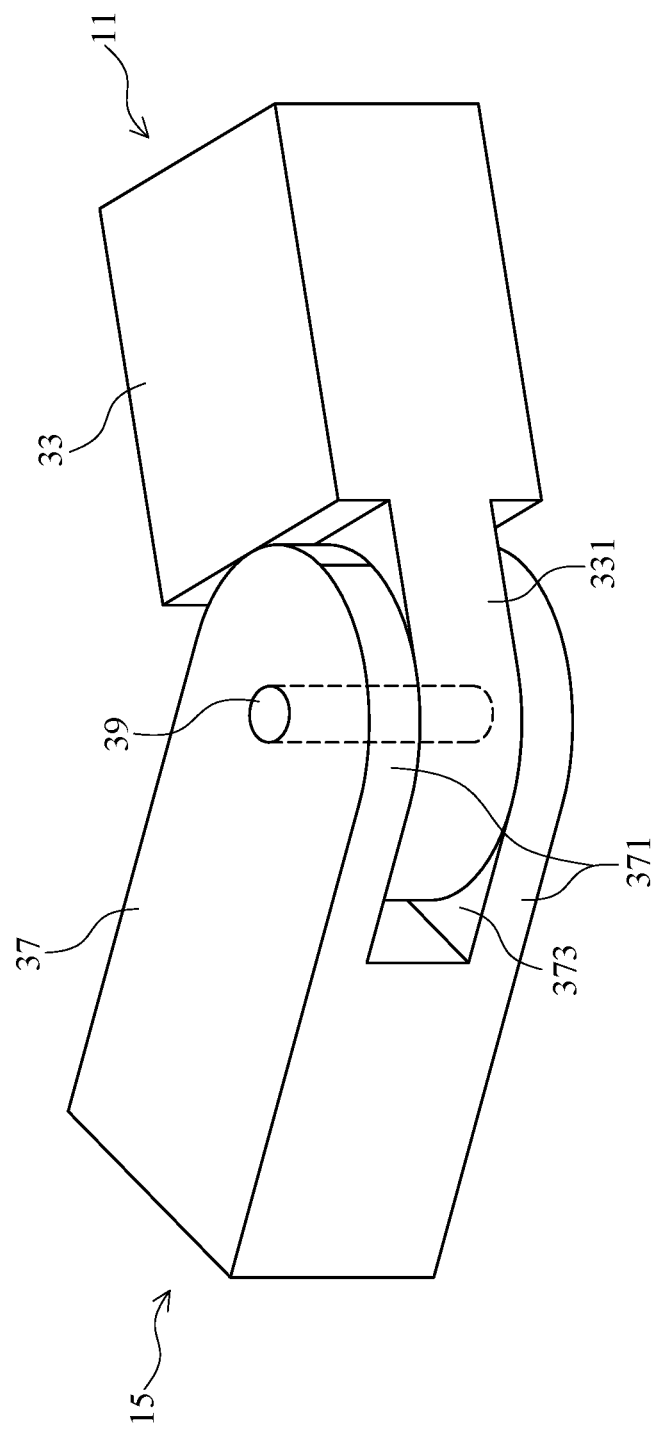
FIG. 5 is a perspective view of an optical to electrical adapter according to another embodiment of the invention.

Please referring to FIG. 5, is a perspective view of an optical to electrical adapter according to another embodiment of the invention. In FIG. 1 and FIG. 2, there is an overlap region between the first housing 13 and the second housing 17, and a rotating mechanism 19 penetrates the overlap region, so that the first housing 13 and the second housing 17 can be rotated relatively by the rotating mechanism 19.

In the embodiment of the invention, the first housing 33 may include at least one first protruding unit 331, wherein the first protruding unit 331 is located at the end where the electrical transmission unit 11 is not disposed. The second housing 37 may include at least one second protruding unit 371, wherein the second protruding unit 371 is located at the end where the optical transmission unit 15 is not disposed. Further, the thickness of the first protruding unit 331 is smaller than that of the first housing 33, and the thickness of the second protruding unit 371 is smaller than that of the second housing 37.

In one embodiment of the invention, the first housing 33 may include one first protruding unit 331, and the second housing 37 may include two or more than two second protruding units 371, wherein a recess 373 is formed between two adjacent second protruding units 371. The first protruding unit 331 can be inserted into the recess 373, and the first protruding unit 331 and the second protruding unit 371 are connected by the rotating mechanism 39, such that the first housing 33 and the second housing 37 can be rotated relatively by the rotating mechanism 39, as shown in FIG. 5. In other embodiment of the invention, the first housing 33 may include two or more than two first protruding units 331, and the second housing 37 may include one second protruding unit 371.

Figure 6:
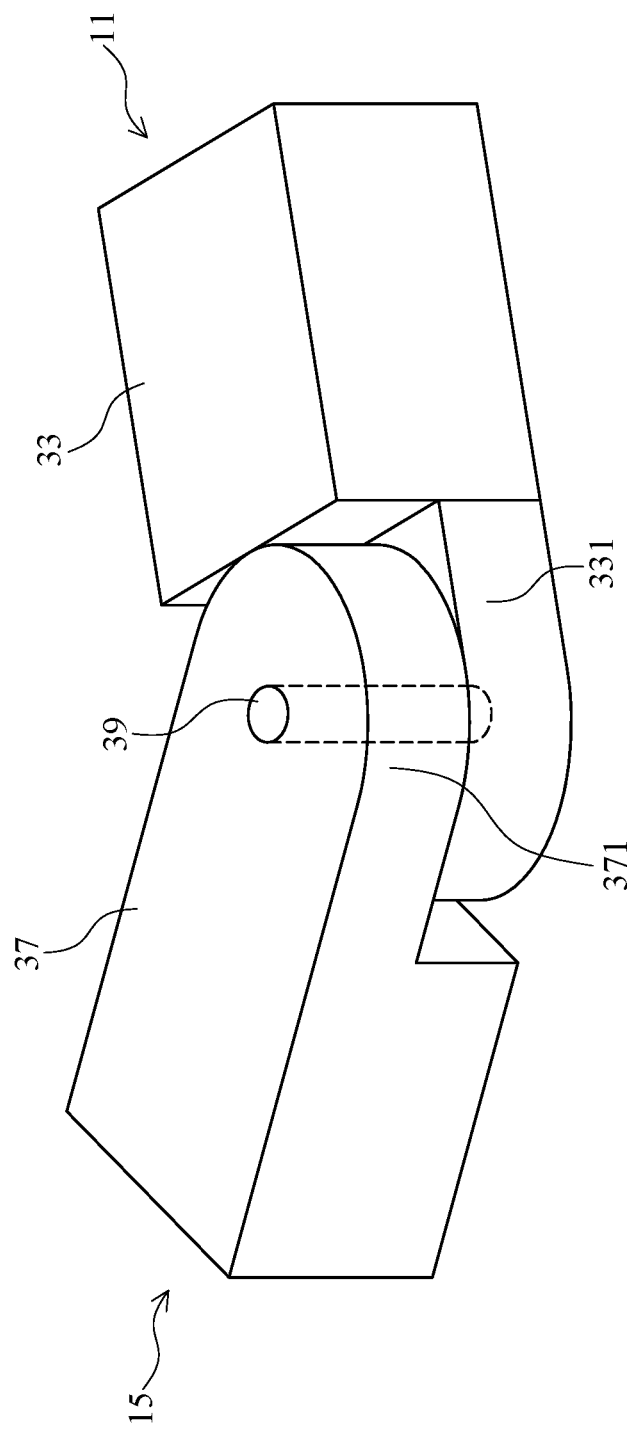
FIG. 6 is a perspective view of an optical to electrical adapter according to another embodiment of the invention.

In another embodiment of the invention, the number of the first protruding unit 331 and the second protruding unit 371 may be one, and the thickness of the first housing 33 and the second housing 37 are similar. Further, the thickness of the first protruding unit 331 may be half of the first housing 33, and the thickness of the second protruding unit 371 may be half of the second housing 37. The first protruding unit 331 may overlap the second protruding unit 371, and the rotating mechanism 39 connects the first protruding unit 331 and the second protruding unit 371, as shown in FIG. 6.

Figure 7:
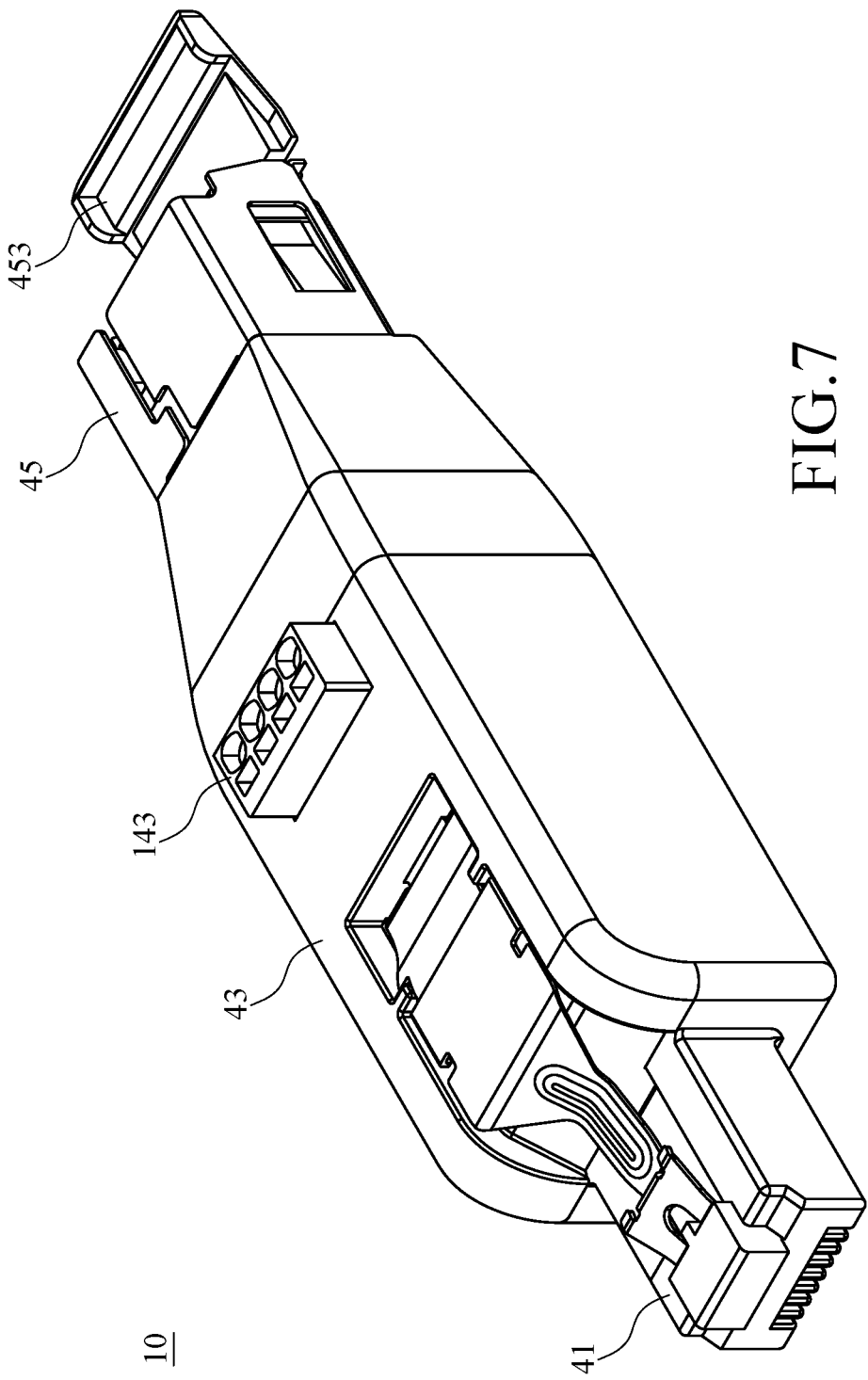
FIG. 7 is a perspective view of an optical to electrical adapter according to another embodiment of the invention.

Please referring to FIG. 7, is a perspective view of an optical to electrical adapter according to another embodiment of the invention. The optical to electrical adapter 40 of the embodiment includes an electrical transmission unit 41, a housing 43 and an optical transmission unit 45, wherein the two ends of the housing 43 are respectively connected to the electrical transmission unit 41 and the optical transmission unit 45.

The electrical transmission unit 41 is configured to transmit and receive an electrical signal, wherein the electrical transmission unit 41 can be an electrical connector or a male connection unit, such as a USB or an RJ-45 male connector, and can be inserted an electrical connection seat 21 or a female connection unit, such as a USB connection seat or an RJ-45 connection seat, on the computer 20. Thus, the electrical transmission unit 41 is communicatively connected to the computer 20, and transmits or receives the electrical signal with the computer 20.

The optical transmission unit 45 is configured to transmit and receive the optical signal and is electrically connected to the electrical transmission unit 41. The optical transmission unit 45 may be an optical connection seat or a female connection unit, such as ST, SC, FC or LC connection seat, and the corresponding optical connector 23 can be inserted into the optical transmission unit 45. For example, ST, SC, FC, or LC connector can be inserted into ST, SC, FC or LC connection seat. The optical transmission unit 45 is communicatively connected to the optical connector 23, and receives or transmits optical signals with the optical connector 23. For example, the optical transmission unit 45 transmits the optical signal to the optical connector 23, or receives the optical signal form the optical connector 23.

The optical to electrical adapter 40, the electrical transmission unit 41, and the optical transmission unit 45 of the embodiment are substantially equivalent to the optical to electrical adapter 10, the electrical transmission unit 11 and the optical transmission unit 15 of the above embodiment. Specifically, the main difference between both embodiments is that the optical to electrical adapter 40 of the embodiment is not provided with the rotating mechanism 19, and further the electrical transmission unit 41 and the optical transmission unit 45 of the embodiment are connected to the same housing 43.

In one embodiment of the invention, the optical to electrical adapter 40 may include a cover 453 that is used to cover the optical transmission unit 45 to prevent external dust entering the optical transmission unit 45. Specifically, the cover 453 can be connected to the optical transmission unit 45 or the housing 43 through a rotating shaft, so that the cover 453 is rotatable relatively to the optical transmission unit 45 or the housing 43 to cover or open the optical transmission unit 45.

In one embodiment of the invention, the optical to electrical adapter 40 may further include a power input terminal 143 disposed on the side surface of the housing 43. Specifically, the power input unit 143 can be an external power input interface, such as a power connection seat, and can be used to connect an external power transmission line. When the electrical connection seat 21 of the computer 20 cannot provide the supply power to the optical to electrical adapter 40, the supply power can be provided to the optical to electrical adapter 40 through the power input unit 143.

Figure 8:
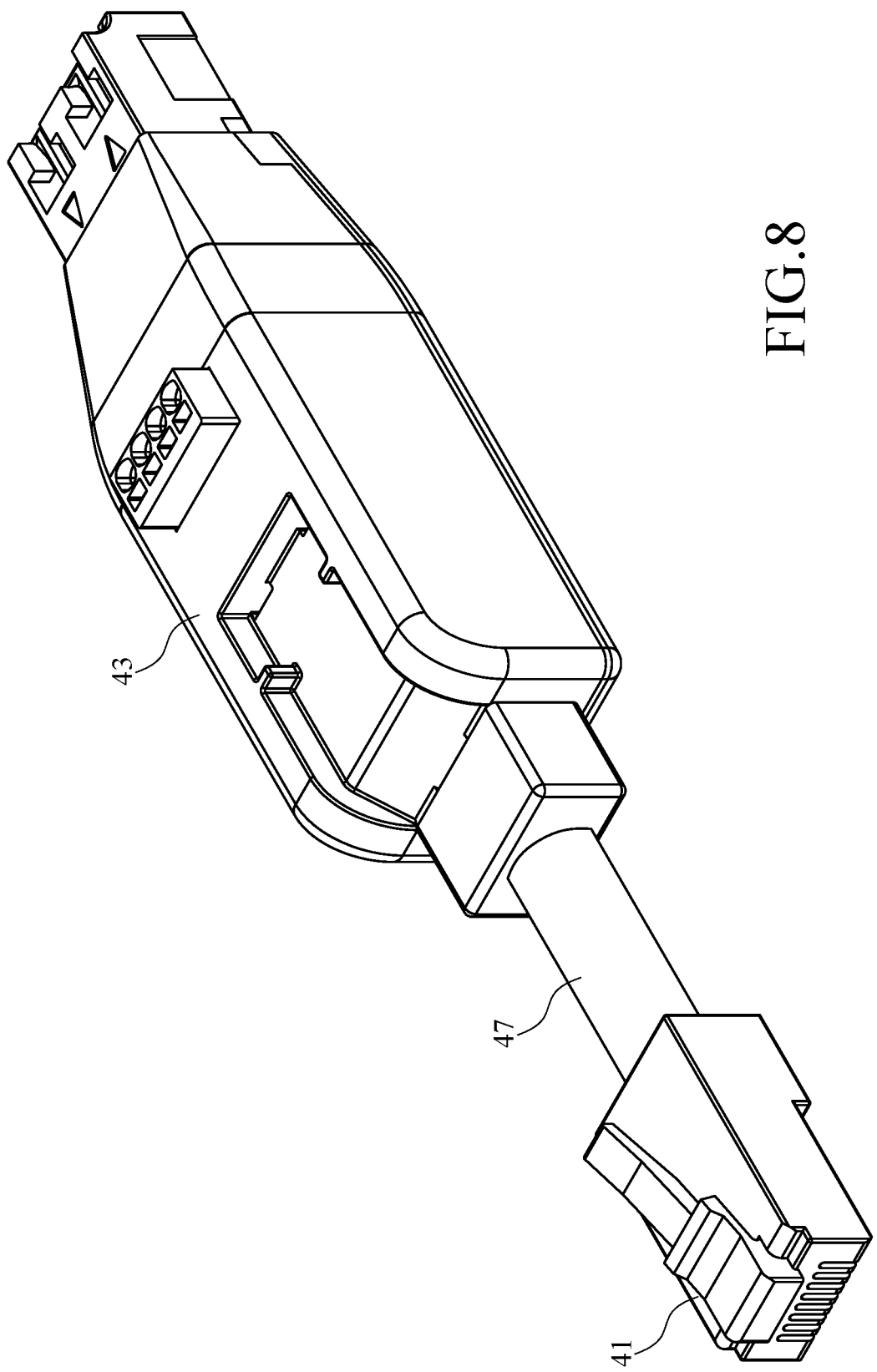
FIG. 8 is a perspective view of an optical to electrical adapter according to another embodiment of the invention.

In another embodiment of the invention, the electrical transmission unit 41 may not be directly disposed on the housing 43. The electrical transmission unit 40 is connected to the housing 43 through a signal transmission line 47, and thus the electrical signal transmission between the electrical transmission unit 41 and the housing 43 is performed via the signal transmission line 47, as shown in FIG. 8.

The above disclosures are only the preferred embodiments of the present invention, and are not to be used to limit the scope of the present invention. All equivalent variations and modifications on the basis of shapes, structures, features and spirits described in claims of the present invention should be included in the claims of the present invention.

The invention claimed is:

1. An optical to electrical adapter comprising:
an electrical transmission unit for transmitting and receiving an electrical signal;
a first housing connected to said electrical transmission unit;
an optical transmission unit for transmitting and receiving an optical signal, and electrically connecting to said electrical transmission unit;
a second housing connected to said optical transmission unit, and partially overlapping said first housing to form an overlap region therebetween; and
a rotating mechanism connecting said overlap region between said first housing and said second housing, such that said first housing and said electrical transmission unit are rotatable relatively to said second housing and said optical transmission unit by said rotating mechanism, wherein when that said first housing is rotatable relatively to said second housing by said rotating mechanism, the angle between extension lines of said electrical transmission unit of said first housing and said optical transmission unit of said second housing is adjusted, and said electrical transmission unit is still electrically connected to said optical transmission unit.

2. The optical to electrical adapter of claim 1, further comprising a converter electrically connected to said optical transmission unit and said electrical transmission unit.

3. The optical to electrical adapter of claim 2, further comprising a power management unit electrically connected to said converter and providing a driving power to said converter.

4. The optical to electrical adapter of claim 3, wherein said power management unit comprises a power input unit and a control unit, said control unit is electrically connected to said power input unit and said electrical transmission to determine whether there is a supply power on said electrical transmission unit, and control whether said power input unit supplies said driving power to said converter.

5. The optical to electrical adapter of claim 1, wherein said electrical transmission unit is an electrical connector for inserting into an electrical connection seat of a computer, wherein said optical transmission unit is an optical connection seat, and at least one optical connector is inserted into said optical transmission unit.

6. The optical to electrical adapter of claim 5, wherein said electrical connector is a USB connector or an RJ-45 connector, and said optical connection seat is an ST connection seat, an SC connection seat, a FC connection seat or a LC connection seat.

7. The optical to electrical adapter of claim 1, wherein said first housing partially overlaps said second housing, and said rotating mechanism penetrates said overlap region between said first housing and said second housing.

8. The optical to electrical adapter of claim 7, wherein said rotating mechanism comprises a rotating shaft, and said first housing and said second housing respectively comprise a first hole and a second hole, and said rotating shaft passes through said first hole and said second hole to connect said first housing and said second housing.

9. The optical to electrical adapter of claim 1, wherein said first housing comprises at least one first protruding unit, and said second housing comprises at least one second protruding unit, wherein said first protruding unit overlaps said second protruding unit, and said rotating mechanism connects said first protruding unit and said second protruding unit.

10. The optical to electrical adapter of claim 9, wherein said second housing has a plurality of second protruding units, and a recess is formed between adjacent second protruding units, wherein said first protruding unit is inserted into said recess.

* * * * *